United States Patent
Smith et al.

(10) Patent No.: US 11,834,022 B2
(45) Date of Patent: *Dec. 5, 2023

(54) BRAKE SELECTION DEVICE FOR INDICATING AN ACTUAL POSITION OF A PARKING BRAKE SYSTEM

(71) Applicant: The Boeing Company, Chicago, IL (US)

(72) Inventors: Steven Elliot Smith, Lynnwood, WA (US); David T. Yamamoto, Mill Creek, WA (US); Nima Forghani, Seattle, WA (US)

(73) Assignee: The Boeing Company, Chicago, IL (US)

( * ) Notice: Subject to any disclaimer, the term of this patent is extended or adjusted under 35 U.S.C. 154(b) by 788 days.

This patent is subject to a terminal disclaimer.

(21) Appl. No.: 16/535,945

(22) Filed: Aug. 8, 2019

(65) Prior Publication Data

US 2021/0039621 A1 Feb. 11, 2021

(51) Int. Cl.
*B60T 7/04* (2006.01)
*B60T 17/22* (2006.01)
(Continued)

(52) U.S. Cl.
CPC .............. *B60T 17/221* (2013.01); *B60T 7/04* (2013.01); *B60T 7/085* (2013.01); *B60T 13/686* (2013.01);
(Continued)

(58) Field of Classification Search
CPC .......... B60T 17/221; B60T 7/04; B60T 7/085; B60T 13/686; B60T 2270/82;
(Continued)

(56) References Cited

U.S. PATENT DOCUMENTS 9,421,958 B2 * 8/2016 Dix ...................... B60T 13/22
2005/0001481 A1 * 1/2005 Kley ..................... B60T 8/5037
303/191

(Continued)

FOREIGN PATENT DOCUMENTS

EP 1633612 A1 3/2006
EP 2069174 A2 6/2009
(Continued)

OTHER PUBLICATIONS

EP, Search Report, EP Patent Application 20186752.0-1012 (dated Sep. 21, 2020).

(Continued)

*Primary Examiner* — Shardul D Patel
(74) *Attorney, Agent, or Firm* — Vivacqua Crane PLLC

(57) ABSTRACT

A parking brake system is disclosed and includes one or more pressure transducers that monitor the fluid pressure of the parking brake system and a brake selection device configured to indicate the parking brake system is either in an engaged state or a disengaged state. The parking brake system includes one or more processors and a memory coupled to the one or more processors. The memory stores data comprising a database and program code that, when executed by the one or more processors, causes the parking brake system to determine the fluid pressure of the parking brake system is less than a threshold pressure. In response to determining the fluid pressure of the parking brake system is less than the threshold pressure, the parking brake system instructs the brake selection device to indicate the parking brake system is in the disengaged state.

21 Claims, 7 Drawing Sheets

(51) Int. Cl.
  *B60T 7/08*   (2006.01)
  *B60T 13/68*  (2006.01)
  *B64C 25/42*  (2006.01)
  *B64C 25/44*  (2006.01)

(52) U.S. Cl.
  CPC ............ *B64C 25/426* (2013.01); *B64C 25/44* (2013.01); *B60T 2270/82* (2013.01); *B60T 2270/88* (2013.01)

(58) Field of Classification Search
  CPC .... B60T 2270/88; B60T 8/1703; B60T 17/22; B60T 13/662; B64C 25/426; B64C 25/44; B64C 25/42; B64C 25/22; B64C 25/26
  USPC .............................................................. 701/3
  See application file for complete search history.

(56) References Cited

U.S. PATENT DOCUMENTS

| | | | | |
|---|---|---|---|---|
| 2008/0133073 | A1* | 6/2008 | Griffith | ................. B60T 13/746 |
| | | | | 701/9 |
| 2009/0096281 | A1* | 4/2009 | Rowan | ..................... B60T 8/32 |
| | | | | 303/114.1 |
| 2011/0308898 | A1* | 12/2011 | Shiraki | ................. B60T 13/741 |
| | | | | 188/72.4 |
| 2014/0014447 | A1* | 1/2014 | O'Connell | ............. B64C 25/44 |
| | | | | 74/483 PB |
| 2015/0127195 | A1* | 5/2015 | Cahill | ..................... B64C 25/44 |
| | | | | 701/3 |
| 2015/0314751 | A1* | 11/2015 | Bleckmann | .............. B60D 1/62 |
| | | | | 701/70 |
| 2018/0029571 | A1* | 2/2018 | Schick | .................. B60T 8/1708 |
| 2018/0133073 | A1* | 5/2018 | Kapec | ................. A61F 13/5518 |
| 2018/0215357 | A1 | 8/2018 | Cahill et al. | |
| 2019/0232937 | A1 | 8/2019 | Georgin et al. | |

FOREIGN PATENT DOCUMENTS

| | | |
|---|---|---|
| EP | 2871104 A1 | 5/2015 |
| EP | 3275745 A1 | 1/2018 |

OTHER PUBLICATIONS

Non-Final Office Action dated Dec. 15, 2020, U.S. Appl. No. 16/535,948.

Canada Intellectual Property Office. Search Report for CA Application No. 3,086,581, dated Sep. 6, 2023.

* cited by examiner

BRAKE SELECTION DEVICE FOR INDICATING AN ACTUAL POSITION OF A PARKING BRAKE SYSTEM

INTRODUCTION

The present disclosure relates to a parking brake system. More particularly, the present disclosure is directed towards a brake selection device that indicates an actual position of the parking brake system.

BACKGROUND

An aircraft includes a parking brake lever or other selection mechanism that is used by a pilot to engage the parking brake. Specifically, in at least some systems, the pilot may depress the brake pedals and then activate the parking brake lever, which in turn closes a hydraulic parking brake valve. When the parking brake valve is closed, pressurized hydraulic fluid is trapped within the brakes. In other words, there is no mechanical linkage that retains the aircraft's parking brake in place.

In operation, the parking brake lever is pulled upwardly by the pilot and into an engaged position thus trapping the fluid within the brakes. However, it is to be appreciated that the parking brake lever only reflects the commanded position of the parking brakes, and not the actual state of the brake system. Therefore, in the event the parking brake valve is unable to maintain sufficient pressure to keep the parking brake system engaged, the parking brake lever still remains in the engaged position.

SUMMARY

According to several aspects, a parking brake system is disclosed. The parking brake system includes one or more pressure transducers that monitor a fluid pressure of the parking brake system, a brake selection device configured to indicate the parking brake system is either in an engaged state or a disengaged state, one or more processors in electronic communication with the brake selection device and the one or more pressure transducers, and a memory coupled to the one or more processors. The memory stores data comprising a database and program code that, when executed by the one or more processors, causes the parking brake system to receive a plurality of brake signals indicating the parking brake system is being placed into the engaged state. In response to receiving the plurality of brake signals, the parking brake system is caused to monitor the one or more pressure transducers to determine the fluid pressure of the parking brake system. The parking brake system determines the fluid pressure of the parking brake system is less than a threshold pressure. In response to determining the fluid pressure of the parking brake system is less than the threshold pressure, the brake control system commands the brake selection device to indicate the parking brake system is in the disengaged state.

In another aspect, a method of operating a parking brake system is disclosed, where the parking brake system includes a brake selection device configured to indicate the parking brake system is either in an engaged state or a disengaged state. The method comprises receiving, by a computer, a plurality of brake signals indicating the parking brake system is being placed into the engaged state. In response to receiving the plurality of brake signals, the method includes monitoring one or more pressure transducers to determine fluid pressure of the parking brake system. The method also includes determining the fluid pressure at the parking brake system is less than a threshold pressure. In response to determining the fluid pressure of the parking brake system is less than the threshold pressure, the method includes commanding the brake selection device to indicate the parking brake system is in the disengaged state.

In still another aspect, an aircraft having a parking brake system is disclosed. The aircraft includes a plurality of pedals configured to generate a brake signal, wherein the brake signal indicates the plurality of pedals are depressed, a parking brake valve configured to adjust hydraulic pressure supplied to the parking brake system, one or more pressure transducers that monitor the hydraulic pressure of the parking brake system, and a brake selection device configured to generate a set signal in response to being placed into an engaged state. The brake selection device indicates that the parking brake system is either in an engaged state or a disengaged state. The aircraft further includes one or more processors in electronic communication with the brake selection device, the parking brake valve, the plurality of pedals, and the one or more pressure transducers and a memory coupled to the one or more processors. The memory stores data comprising a database and program code that, when executed by the one or more processors, causes the parking brake system to receive the set signal from the brake selection device and the brake signal from the plurality of pedals. In response to receiving the set signal from the brake selection device and the brake signal from the plurality of pedals, the parking brake system is caused to monitor the one or more pressure transducers to determine the hydraulic pressure of the parking brake system. The parking brake system is further caused to determine the hydraulic pressure of the parking brake system is less than a threshold pressure. In response to determining the hydraulic pressure of the parking brake system is less than the threshold pressure, the parking brake system is caused to command the brake selection device to indicate the parking brake system is in the disengaged state.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a fault tolerant parking brake system for a vehicle. The parking brake system includes a parking brake valve configured to maintain the fluid pressure of the parking brake system, one or more pressure transducers that monitor the fluid pressure of the brake system, and a brake selection device. The brake selection device is configured to indicate the parking brake system is either in an engaged state or a disengaged state. The parking brake system also includes one or more processors that monitor the pressure transducers. If the one or more processors determine the fluid pressure of the brake system is less than a threshold pressure, then the processors instruct the brake selection device to indicate the parking brake system is in the disengaged state. Accordingly, the disclosed brake selection device reflects the actual position of the parking brakes, and not the commanded position.

The following description is merely exemplary in nature and is not intended to limit the present disclosure, application, or uses.

Figure 1:
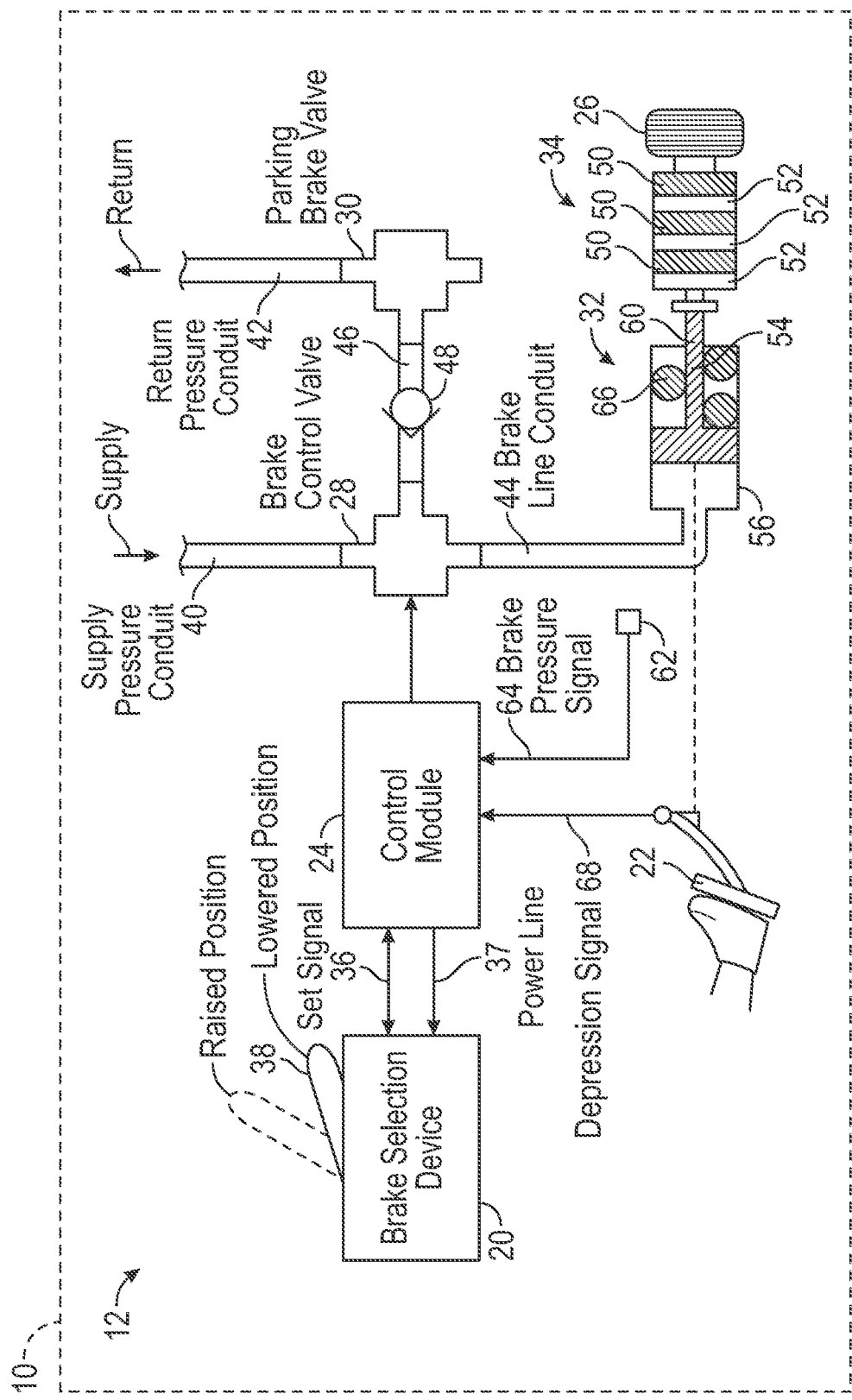
FIG. 1 is a schematic diagram of a parking brake system for a vehicle, according to an exemplary embodiment.

Referring now to FIG. 1, a schematic diagram illustrating a parking brake system 12 for a vehicle 10 is shown. The parking brake system 12 includes a brake selection device 20, a plurality of brake pedals 22 (only one brake pedal 22 is visible in FIG. 1), a control module 24, a plurality of wheels 26 (only one wheel 26 is shown in FIG. 1), a brake control valve 28, a parking brake valve 30, a piston cylinder assembly 32, and a brake stack 34. The control module 24 is in electronic communication with the brake selection device 20, the plurality of brake pedals 22, the brake control valve 28, and the parking brake valve 30. As explained below, the brake selection device 20 indicates the actual state of the parking brake system 12, and not the commanded state of the parking brake system 12.

The brake selection device 20 is configured to indicate the parking brake system 12 is either in an engaged state or a disengaged state. For example, in the non-limiting embodiment as shown in FIG. 1, the brake selection device 20 includes a lever 38 that indicates the state of the parking brake system 12. Specifically, when the lever 38 is in a lowered position as seen in FIG. 1, the parking brake system 12 is in the disengaged state. However, when the lever 38 is moved into a raised position (shown in phantom line), the parking brake system 12 is in the engaged state. Although FIG. 1 illustrates a lever 38, it is to be appreciated that FIG. 1 is merely exemplary in nature and the brake selection device 20 may be any other type of selection device. For example, in an alternative embodiment the brake selection device 20 is a pushbutton. The brake selection device 20 is configured to generate a set signal 36 in response to being placed in the engaged state, where the set signal 36 is sent to the control module 24. The control module 24 also provides power to a solenoid valve 35 (seen in FIG. 2) of the brake selection device 20 by a power line 37.

In an embodiment, the vehicle 10 is an aircraft. However, it is to be appreciated that the disclosed parking brake system 12 may be used in any vehicle employing a brake-by-wire system. In one non-limiting embodiment, the parking brake system 12 employs a hydraulic brake fluid. However, the parking brake system 12 is not limited to hydraulic systems. For example, in another embodiment, the parking brake system 12 is a pneumatic system. It is also to be appreciated that while FIG. 1 illustrates only a single parking brake system 12, an aircraft may actually include multiple parking brake systems 12. For example, an aircraft may include separate brake systems that correspond to the left and right wheels of an aircraft.

Figure 2:
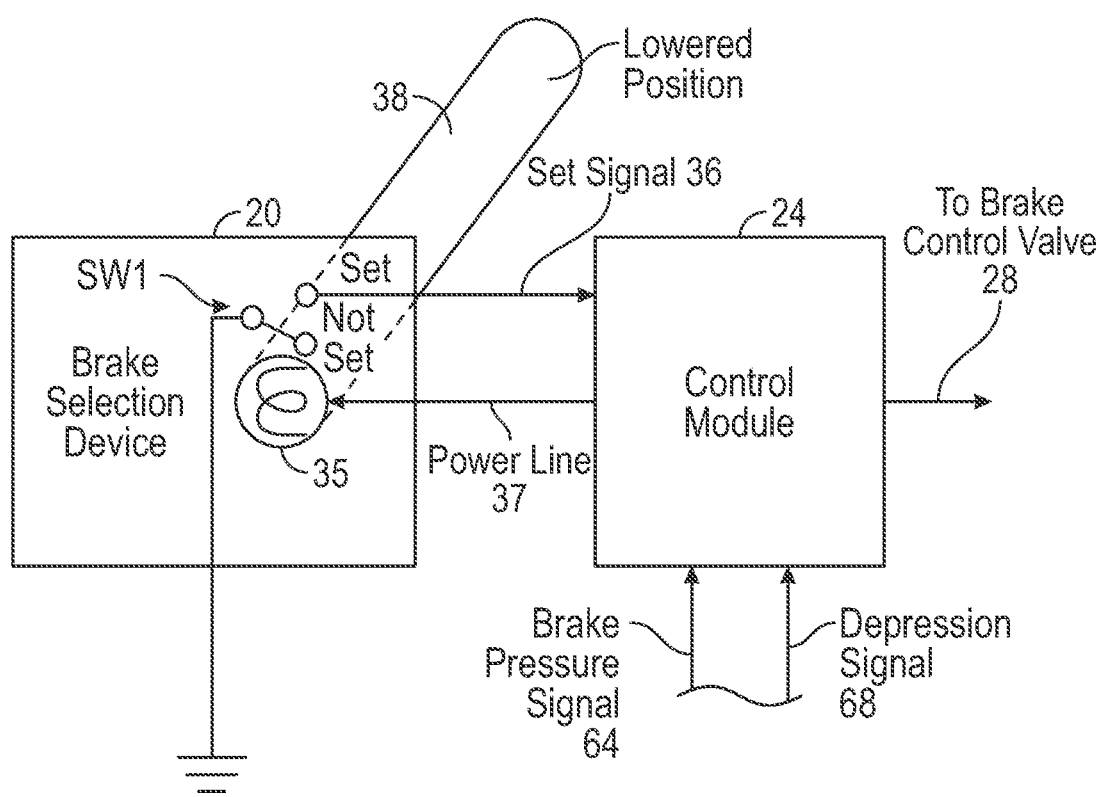
FIG. 2 is a schematic diagram of a brake selection device shown in FIG. 1, according to an exemplary embodiment.

FIG. 2 is an exemplary schematic diagram of the brake selection device 20. The brake selection device 20 includes a first switch SW1 and a solenoid valve 35 that are in electronic communication with the control module 24. In the embodiment as shown, the first switch SW1 is a single pole double throw switch, however, it is to be appreciated that other types of switches may be used as well. The first switch SW1 includes two positions, which are SET and NOT SET. The lever 38 is operably connected to both the first switch SW1 and the solenoid valve 35. Thus, raising the lever 38 into the engaged state causes the first switch SW1 to actuate into the SET position, and the set signal 36 is sent to the control module 24. Similarly, lowering the lever 38 causes the first switch SW1 to actuate into the NOT SET position. The control module 20 provides power to the solenoid valve 35 through the power line 37, where the solenoid valve 35 is energized by the electrical power provided by the power line 37 to lock the lever 38 into the raised position (shown in FIG. 1).

Referring to FIG. 1, the parking brake system 12 also includes a supply pressure conduit 40, a return pressure conduit 42 and a brake line conduit 44. The supply pressure conduit 40 is fluidly connected to the brake control valve 28, the return pressure conduit 42 is fluidly connected to the parking brake valve 30, and the brake line conduit 44 is fluidly connected to the piston cylinder assembly 32. The brake control valve 28 is configured to actuate between a closed position and an opened position. When the brake control valve 28 is in the closed position, then the brake control valve 28 fluidly connects the brake line conduit 44 with the return pressure conduit 42. When the brake control valve 28 is in the opened position, the brake control valve 28 fluidly connects the brake line conduit 44 with the supply pressure conduit 40 and pressurized brake fluid is supplied to piston cylinder assembly 32.

The parking brake valve 30 is configured to maintain the fluid pressure of the parking brake system 12. Specifically, the parking brake valve 30 is configured to maintain fluid pressure at the piston cylinder assembly 32 of the parking brake system 12. In an embodiment, if the parking brake system 12 is a hydraulic brake system, then the parking brake valve 30 is configured to maintain hydraulic pressure within the parking brake system 12. The parking brake system 12 also includes a check valve 48 that is disposed in a conduit 46 connecting the brake control valve 28 with the parking brake valve 30. The check valve 48 prevents brake fluid from flowing from the return pressure conduit 42 and to the brake control valve 28. When the parking brake valve 30 is moved from an opened position and into a closed position, pressurized brake fluid is held in the brake line conduit 44. In other words, when the parking brake valve 30 is in the closed position, pressurized brake fluid is held in the brake line conduit 44 at a threshold pressure for a limited amount of time, and the parking brake system 12 is in the engaged state, as is discussed in more detail below.

The brake stack 34 includes one or more rotors 50 and one or more stators 52, where the rotors 50 rotate in concert with the wheels 26. The piston cylinder assembly 32 includes a piston or force member 54, a cylinder 56, and a biasing element 66, where the force member 54 is configured to translate back and forth in a linear motion within the cylinder 56. In the embodiment as shown, the biasing element 66 is a coil spring. When the brake control valve 28 is opened to fluidly connect the supply pressure conduit 40 with the brake line conduit 44, pressurized brake fluid is supplied to piston cylinder assembly 32 and causes the force member 54 to overcome a biasing force exerted by the biasing element 66. Once the force member 54 overcomes the biasing force, the force member 54 translates within the cylinder 56 in a direction towards the brake stack 34. The force member 54 continues to travel towards the brake stack 34 until an end portion 60 of the force member 54 abuts against and exerts a compressive force upon the brake stack 34. When the brake stack 34 is compressed, friction forces are developed between the rotors 50 and stators 52 that resist rotation of the wheels 26.

Continuing to refer to FIG. 1, the plurality of brake pedals 22 are operatively coupled to the force member 54 located within the cylinder 56. Accordingly, when an operator depresses the plurality of brake pedals 22, this causes the force member 54 to translate within the cylinder 56 in a direction towards the brake stack 34 to exert a compressive force upon the brake stack 34. As seen in FIG. 1, the plurality of brake pedals 22 are in communication with the control module 24. The plurality of brake pedals 22 are configured to generate a depression signal 68 in response to being depressed. Specifically, the plurality of brake pedals 22 generate the depression signal 68, which is sent to the control module 24, in response to being depressed by an operator.

The parking brake system 12 further includes one or more pressure transducers 62 in electronic communication with the control module 24. The pressure transducers 62 monitor the fluid pressure of the parking brake system 12 and generates a proportional electrical signal that is referred to as a brake pressure signal 64. Specifically, the brake pressure signal 64 represents the fluid pressure at the piston cylinder assembly 32 of the parking brake system 12.

An operator may attempt to place the parking brake system 12 into the engaged state. However, sometimes there is a fault present in the parking brake system 12 which may prevent the parking brake system 12 from maintaining an engaged state, as the parking brake system 12 is unable to maintain sufficient pressure to remain in the engaged state. One example of a fault is when the parking brake valve 30 is inoperative and unable to remain in the closed position to hold brake fluid pressure. Some other examples of faults that may cause the parking brake system 12 from maintaining the engaged state include fluid escaping from the parking brake system 12 due to issues such as, for example, a leak in tubing. Therefore, in the event there is a fault present in the parking brake system 12 that prevents the parking brake system 12 from maintaining the engaged state, the brake selection device 20 returns back into the disengaged state. Thus, an operator is informed about the actual, and not the commanded state of the parking brake system 12.

Operation of the parking brake system 12 is now described. First, the control module 24 receives a plurality of brake signals indicating the parking brake system 12 is being placed into the engaged state. The parking brake signals indicate an operator, such as a pilot, is attempting to place the parking brake system 12 into the engaged state. Specifically, in an embodiment, the plurality of brake signals include the set signal 36 generated by the brake selection device 20 and the depression signal 68 generated by the plurality of brake pedals 22.

In response to receiving the plurality of brake signals, the control module 24 instructs the parking brake valve 30 to move from the opened position into the closed position. In other words, the control module 24 instructs the parking brake valve 30 to close and block off the return pressure conduit 42 of the parking brake system 12. As mentioned above, when the parking brake valve 30 is placed into the closed position, pressurized brake fluid is held in the brake line conduit 44. In addition to closing the parking brake valve 30, in response to receiving the plurality of brake signals, the control module 24 monitors the one or more pressure transducers 62 to determine the fluid pressure of the parking brake system 12. The control module 24 then compares the fluid pressure of the parking brake system 12 with a threshold pressure.

The threshold pressure represents the fluid pressure required to keep the parking brake system 12 in the engaged state. Therefore, if the fluid pressure of the parking brake system 12 is less than the threshold pressure, this indicates there is a fault in the parking brake system 12 which may prevent the parking brake system 12 from maintaining the engaged state. Specifically, as seen in FIG. 1, the parking brake valve 30 is fluidly connected to the cylinder 56. The threshold pressure indicates the fluid pressure at the piston cylinder assembly 32, which is measured by the one or more pressure transducers 62, is sufficient to keep the force member 54 in place within the cylinder 56 for a predetermined amount of time.

The predetermined amount of time varies between different types of parking brake systems. However, it is to be appreciated that the parking brake system 12 is not expected to maintain the threshold pressure for an infinite amount of time. In other words, it is customary for the parking brake system 12 to lose pressure over time, since the parking brake valve 30 is unable to maintain the fluid pressure in the parking brake system for an infinite amount of time. The predetermined amount of time is based on the parking brake valve 30. In one non-limiting embodiment, if the vehicle 10 is a passenger aircraft, then the predetermined amount of time ranges from about 12 to about 24 hours.

In one embodiment, the control module 24 determines the fluid pressure of the parking brake system 12 is less than the threshold pressure. In response to determining the fluid pressure of the parking brake system 12 (i.e., at the piston cylinder assembly 32) is less than the threshold pressure, the control module 24 instructs the brake selection device 20 to indicate the parking brake system 12 is in the disengaged state. For example, the control module 24 commands the brake selection device 20 to move the lever 38 from the raised position (shown in phantom line) and into the lowered position. Additionally, in response to determining the fluid pressure of the parking brake system 12 is less than the threshold pressure, the control module 24 also instructs the parking brake valve 30 to move back into the opened position. Opening the parking brake valve 30 causes the parking brake system 12 to reset.

Alternatively, in another embodiment, the control module 24 determines the fluid pressure of the parking brake system 12 is equal to or greater than the threshold pressure. In other words, the parking brake system 12 is able to maintain the engaged state. In response to determining the fluid pressure of the parking brake system 12 is equal to or greater than the threshold pressure, the control module 24 continues to instruct the brake selection device 20 to indicate the parking brake system 12 is in the engaged state. For example, the control module 24 instructs the brake selection device 20 to maintain the lever 38 in the raised position (shown in phantom line).

Figure 3:
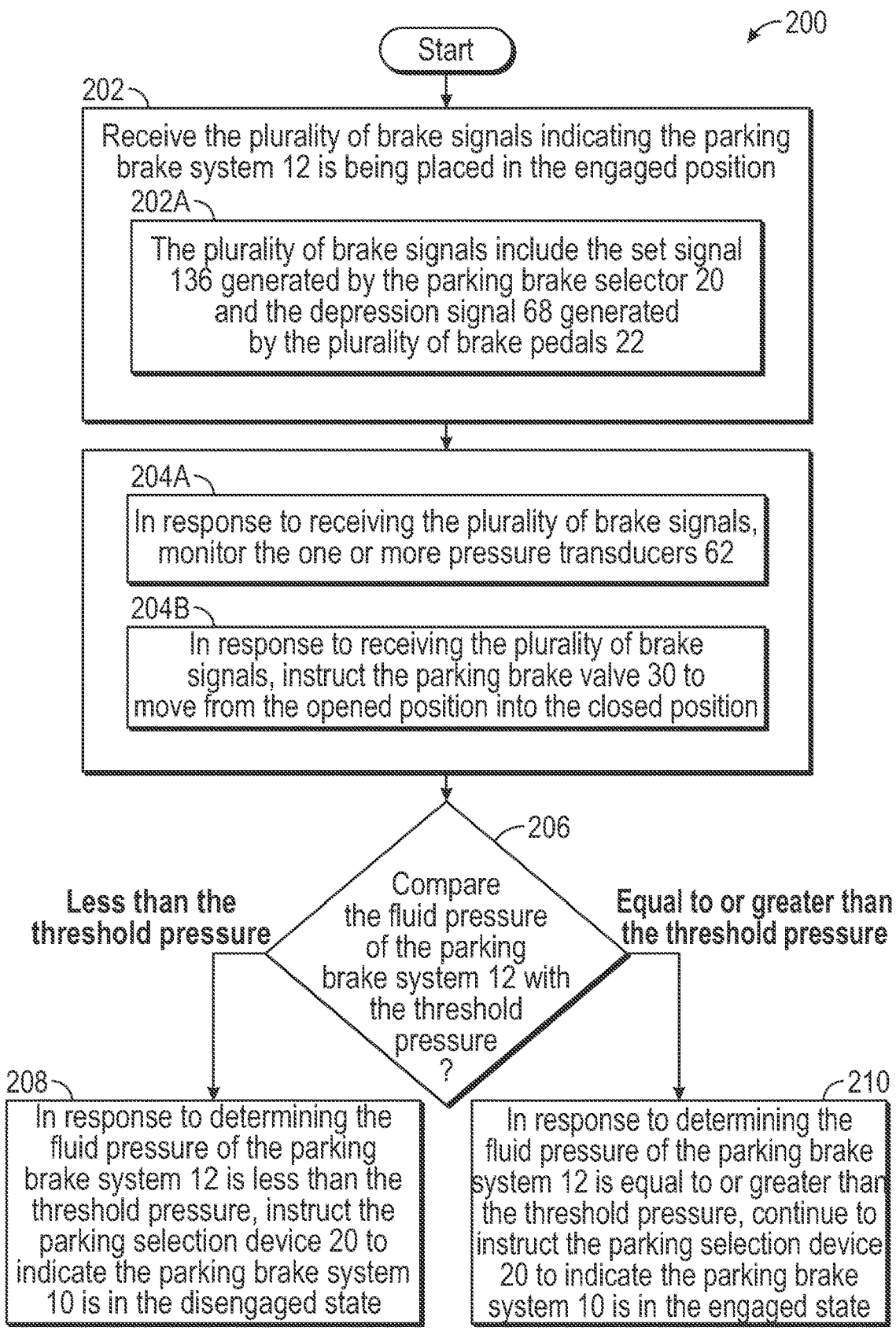
FIG. 3 is a process flow diagram illustrating a method of operating the parking brake system shown in FIG. 1, according to an exemplary embodiment.

FIG. 3 is a process flow diagram illustrating an exemplary method 200 of operating the parking brake system 12 shown in FIG. 1. Referring to both FIGS. 1 and 3, the method 200 begins at block 202. In block 202, the control module 24 receives the plurality of brake signals indicating the parking brake system 12 is being placed into the engaged state. For example, as seen in block 202A, in one embodiment the plurality of brake signals include the set signal 36 generated by the brake selection device 20 and the depression signal 68 generated by the plurality of brake pedals 22. The method 200 may then proceed to block 204A and 204B.

In block 204A, in response to receiving the plurality of brake signals, the control module 24 monitors the one or more pressure transducers 62 to determine the fluid pressure of the parking brake system 12. In block 202B, in response to receiving the parking brake signals, the control module 24 instructs the parking brake valve 30 to move from the opened position into the closed position. It is to be appreciated that the blocks 204A and 204B may be performed at about the same time. The method 200 may then proceed to decision block 206.

In decision block 206, the control module 24 compares the fluid pressure of the parking brake system 12 with the threshold pressure. In response to the control module 24 determining the fluid pressure of the parking brake system 12 is less than the threshold pressure, the method 200 proceeds to block 208.

In block 208, in response to determining the fluid pressure of the parking brake system 12 is less than the threshold pressure, the control module 24 instructs the brake selection device 20 to indicate the parking brake system 12 is in the disengaged state. The method 200 may then terminate.

Referring back to decision block 206, in response to the control module 24 determining the fluid pressure of the parking brake system 12 is equal to or greater than the threshold pressure, the method 200 may proceed to block 210.

In block 210, in response to determining the fluid pressure of the parking brake system 12 is equal to or greater than the threshold pressure, the control module 24 continues to instruct the brake selection device 20 to indicate the parking brake system 12 is in the engaged state. The method 200 may then terminate.

Figure 4:
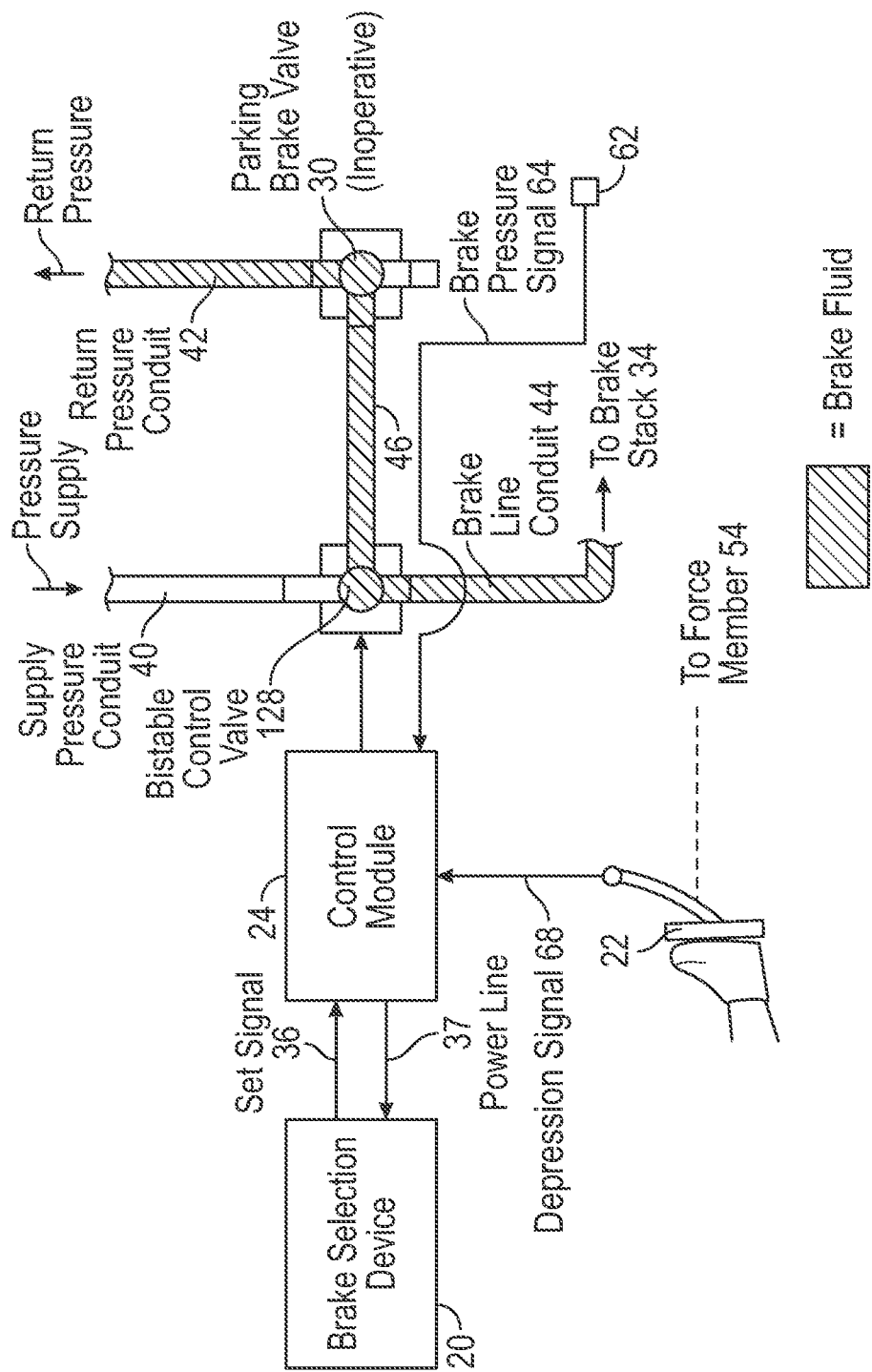
FIG. 4 is an alternative embodiment of the parking brake system shown in FIG. 1, including a bistable control valve shown in a closed position, according to an exemplary embodiment.

FIG. 4 is an alternative embodiment of the parking brake system 12 shown in FIG. 1, where the brake control valve 28 is a bistable control valve 128. The bistable control valve 128 is any type of control valve configured to retain the last switching state, even after an input signal is no longer available. In other words, if the control module 24 were to lose electrical power, the bistable control valve 128 would still remain in the last switching state.

Figure 5:
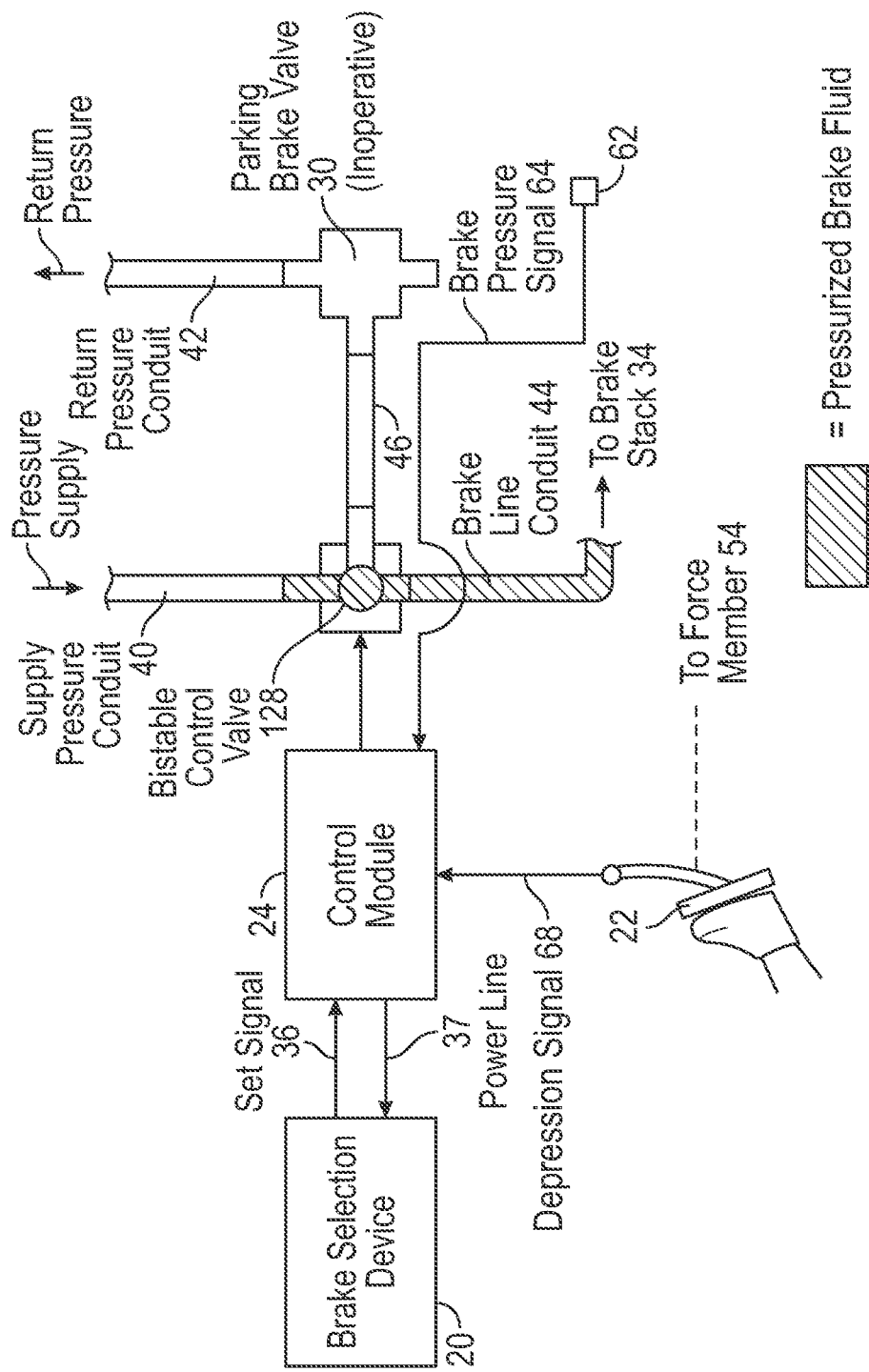
FIG. 5 illustrates the bistable control valve in an opened position to hold pressure within the parking brake system when a brake control valve is inoperative, according to an exemplary embodiment.

The bistable control valve 128 includes two switching states, namely the closed position and the opened position. As mentioned above, the bistable control valve 128 is fluidly connected to the return pressure conduit 42 of the parking brake system 12 when placed in the closed position as seen in FIG. 4. The bistable control valve 128 is fluidly connected to the supply pressure conduit 40 when placed into the opened position as seen in FIG. 5. Accordingly, when the bistable control valve 128 is in the opened position, pressurized brake fluid from a supply source (not shown) is provided to the piston cylinder assembly 32. In an embodiment, the bistable control valve 128 is a mechanically operated hydraulic control valve, however, it is to be appreciated that other types of bistable control valves may be used instead.

In the embodiment as shown in FIG. 4, the parking brake valve 30 is inoperative, and the bistable control valve 128 is in the closed position. In other words, the parking brake valve 30 is unable to move into the opened position to block off the supply of brake fluid to the return pressure conduit 42. As seen in FIG. 4, unpressurized brake fluid is present in the return pressure conduit 42, the brake line conduit 44, and the conduit 46 connecting the bistable control valve 128 with the parking brake valve 30. As a result, unpressurized brake fluid flows to the return pressure conduit 42 of the parking brake system 12.

When the parking brake valve 30 is inoperative, the one or more pressure transducers 62 indicate the fluid pressure of the parking brake system 12 is less than the threshold pressure. The control module 24 receives as input the fluid pressure of the parking brake system 12. The control module 24 then compares the fluid pressure of the parking brake system 12 with the threshold pressure and determines the fluid pressure of the parking brake system 12 is less than the threshold pressure. In response to determining the fluid pressure of the parking brake system 12 is less than the threshold pressure, the control module 24 instructs the bistable control valve 128 to actuate into the opened position, which is seen in FIG. 5.

FIG. 5 is an illustration of the parking brake system 12 in FIG. 4, where the bistable control valve 128 has been actuated from the closed position into the opened position. As seen in FIG. 5, the bistable control valve 128 fluidly connects the brake line conduit 44 with the supply pressure conduit 40 when in the opened position. Therefore, pressurized brake fluid is present in the brake line conduit 44, and the parking brake system 12 is in the engaged state. Accordingly, even if the parking brake valve 30 is inoperative, the parking brake system 12 may still be placed into the engaged state.

Figure 6:
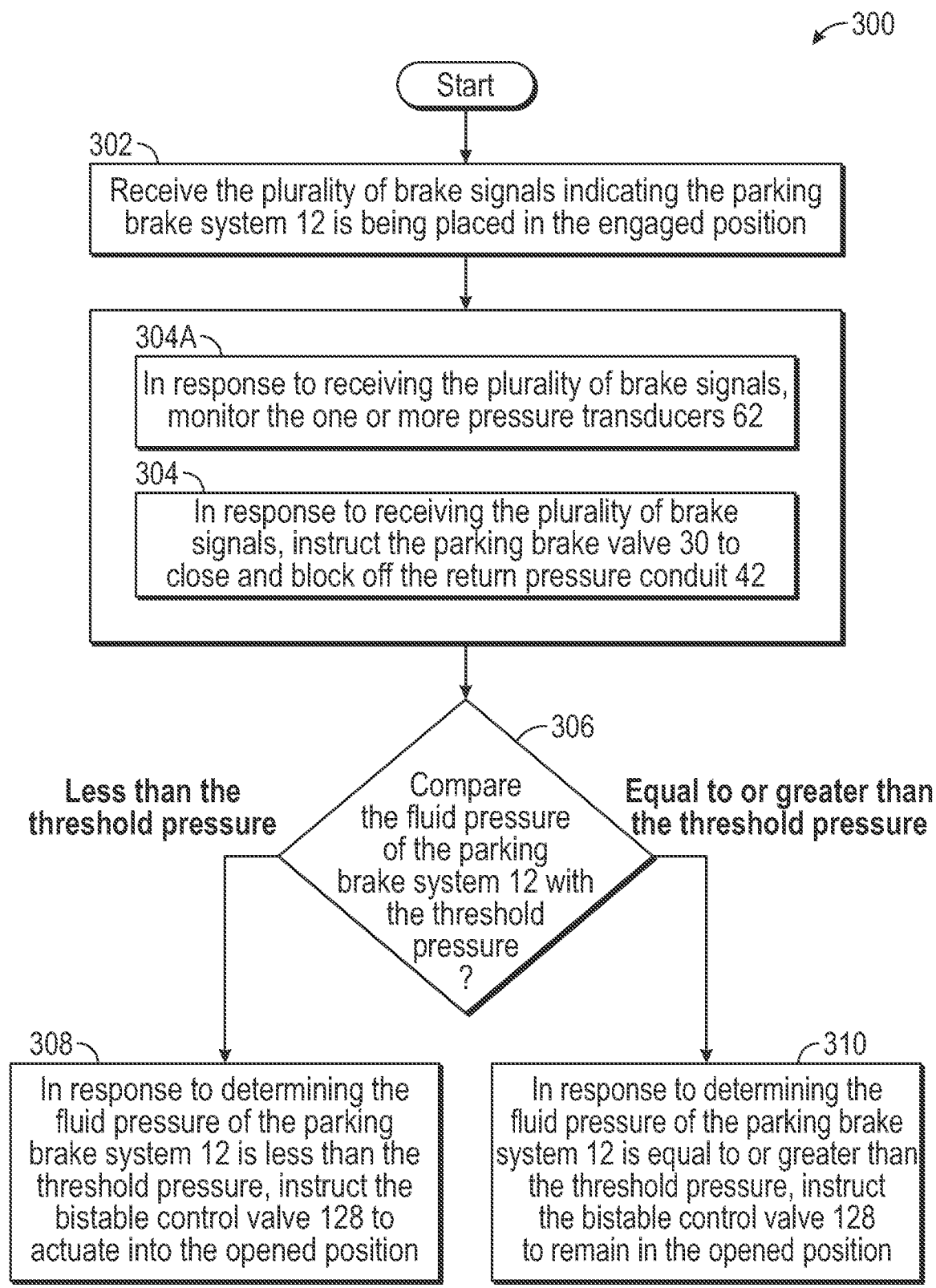
FIG. 6 is a process flow diagram illustrating a method of operating the parking brake system shown in FIGS. 4-5, according to an exemplary embodiment.

FIG. 6 is a process flow diagram illustrating an exemplary method 300 of operating the parking brake system 12 shown in FIGS. 4 and 5. Referring to FIGS. 4, 5, and 6, the method 300 begins at block 302. In block 302, the control module 24 receives the plurality of brake signals indicating the parking brake system 12 is being placed into the engaged state. For example, in one embodiment the plurality of brake signals include the set signal 36 generated by the brake selection device 20 and the depression signal 68 generated by the plurality of brake pedals 22. The method 200 may then proceed to block 304A and 304B.

In block 304A, in response to receiving the plurality of brake signals, the control module 24 monitors the one or more pressure transducers 62 to determine the fluid pressure of the parking brake system 12. In block 302B, in response to receiving the parking brake signals, the control module 24 instructs the parking brake valve 30 to close and block off the return pressure conduit 42 of the parking brake system 12. It is to be appreciated that the blocks 304A and 304B may be performed at about the same time. The method 300 may then proceed to decision block 306.

In decision block 306, the control module 24 compares the fluid pressure of the parking brake system 12 with the threshold pressure. In response to the control module 24 determining the fluid pressure of the parking brake system 12 is less than the threshold pressure, the method 300 proceeds to block 308.

In block 308, in response to determining the fluid pressure of the parking brake system 12 less than the threshold pressure, the control module 24 instructs the bistable control valve 128 to actuate from the closed position (shown in FIG. 4) into the opened position (shown in FIG. 5). The method 300 may then terminate.

Referring back to decision block 306, in response to the control module 24 determining the fluid pressure of the parking brake system 12 is equal to or greater than the threshold pressure, the method 300 may proceed to block 312.

In block 312, in response to determining the fluid pressure of the parking brake system 12 is equal to or greater than the threshold pressure, the control module 24 continues to instruct the bistable control valve 128 to remain in the closed position. The method 300 may then terminate.

Referring generally to the figures, the disclosed parking brake system includes various technical effects and benefits. Specifically, the disclosed system provides an indication to an operator regarding the actual state of the parking brake system, and not the commanded state. Accordingly, if there is a fault in the parking brake system that causes the system to become disengaged, then the operator is aware of the state. Furthermore, the disclosed parking brake system also provides an approach for maintaining the required brake fluid pressure to keep the parking brake system in the engaged state, even when the parking brake valve is inoperative. Finally, unlike some other approaches for keeping the parking brake system in the engaged state, the bistable control valve does not require a mechanical connection between the brake pedals and the brake system.

Figure 7:
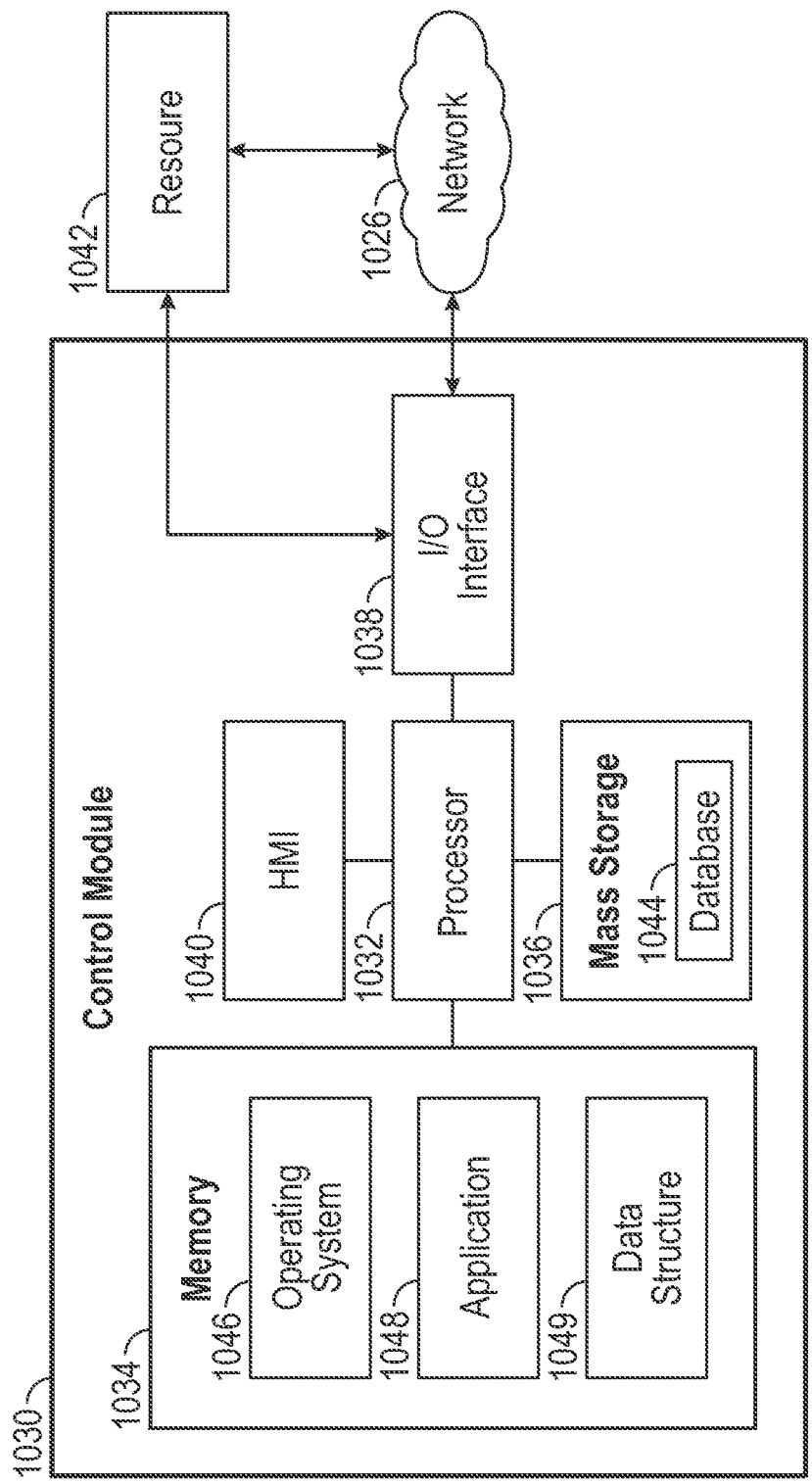
FIG. 7 is a computer control system for operating the disclosed parking brake system, according to an exemplary embodiment.

Referring now to FIG. 7, the control module 24 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A parking brake system that monitors a fluid pressure of the parking brake system, the parking brake system comprising:
   one or more pressure transducers that monitor the fluid pressure of the parking brake system;
   a brake selection device configured to provide a visual indication to an operator of the parking brake system that the parking brake system is either in an engaged state or a disengaged state, wherein the brake selection device indicates an actual state of the parking brake system versus a commanded state, and wherein the actual state of the parking brake system is determined based on the fluid pressure of the parking brake system monitored by the one or more pressure transducers;

one or more processors in electronic communication with the brake selection device and the one or more pressure transducers; and a memory coupled to the one or more processors, the memory storing data comprising a database and program code that, when executed by the one or more processors, causes the parking brake system to:

receive a plurality of brake signals indicating the parking brake system is being placed into the engaged state, wherein the engaged state is the commanded state;

in response to receiving the plurality of brake signals, monitor the one or more pressure transducers to determine the fluid pressure of the parking brake system;

determine the fluid pressure of the parking brake system is less than a threshold pressure; and in response to determining the fluid pressure of the parking brake system is less than the threshold pressure, command the brake selection device to indicate the parking brake system is in the disengaged state, wherein the disengaged state is the actual state.

2. The parking brake system of claim 1, further comprising a parking brake valve configured to maintain the fluid pressure of the parking brake system, wherein the one or more processors execute instructions to:

in response to receiving the plurality of brake signals, instruct the parking brake valve to move from an opened position into a closed position.

3. The parking brake system of claim 2, wherein the one or more processors execute instructions to:

in response to determining the fluid pressure of the parking brake system is less than the threshold pressure, instruct the parking brake valve to move back into the opened position.

4. The parking brake system of claim 1, wherein the one or more processors execute instructions to:

determine the fluid pressure of the parking brake system is equal to or greater than the threshold pressure; and in response to determining the fluid pressure of the parking brake system is equal to or greater than the threshold pressure, continue to instruct the brake selection device to indicate the parking brake system is in the engaged state.

5. The parking brake system of claim 1, further comprising a force member positioned within a cylinder.

6. The parking brake system of claim 5, wherein the threshold pressure indicates the fluid pressure of the parking brake system is sufficient to keep the force member in place within the cylinder for a predetermined amount of time.

7. The parking brake system of claim 1, further comprising a plurality of brake pedals in communication with the one or more processors, wherein the plurality of brake pedals are configured to generate a depression signal in response to being depressed.

8. The parking brake system of claim 7, wherein the brake selection device is configured to generate a set signal in response to being placed in the engaged state.

9. The parking brake system of claim 8, wherein the plurality of braking signals include the set signal generated by the brake selection device and the depression signal generated by the plurality of brake pedals.

10. A method of operating a parking brake system, wherein the parking brake system includes a brake selection device configured to indicate the parking brake system is either in an engaged state or a disengaged state, the method comprising:

receiving, by a computer, a plurality of brake signals indicating the parking brake system is being placed into the engaged state;

in response to receiving the plurality of brake signals, monitoring one or more pressure transducers to determine fluid pressure of the parking brake system;

determining the fluid pressure at the parking brake system is less than a threshold pressure; and in response to determining the fluid pressure of the parking brake system is less than the threshold pressure, commanding the brake selection device to indicate the parking brake system is in the disengaged state, wherein the brake selection device provides a visual indication to an operator of the parking brake system that the parking brake system is either in the engaged state or the disengaged state and indicates an actual state of the parking brake system versus a commanded state, and wherein the actual state is the disengaged state and the commanded state is the engaged state, and wherein the actual state of the parking brake system is determined based on the fluid pressure of the parking brake system monitored by the one or more pressure transducers.

11. The method of claim 10, further comprising:

in response to receiving the plurality of brake signals, instructing a parking brake valve to move from an opened position into a closed position, wherein the parking brake valve is configured to maintain the fluid pressure of the parking brake system.

12. The method of claim 10, further comprising:

determining, by the computer, the fluid pressure of the parking brake system is equal to or greater than the threshold pressure; and in response to determining the fluid pressure of the parking brake system is equal to or greater than the threshold pressure, continuing to instruct the brake selection device to indicate the parking brake system is in the engaged state.

13. The method of claim 10, wherein the plurality of braking signals include a set signal generated by the brake selection device and a depression signal generated by a plurality of brake pedals that are part of the parking brake system.

14. The method of claim 10, wherein the parking brake system further comprises a force member positioned within a cylinder, and wherein the threshold pressure indicates the fluid pressure of the parking brake system is sufficient to keep the force member in place within the cylinder for a predetermined amount of time.

15. An aircraft having a parking brake system, wherein the aircraft comprises:

a plurality of pedals configured to generate a brake signal, wherein the brake signal indicates the plurality of pedals are depressed;

a parking brake valve configured to adjust hydraulic pressure supplied to the parking brake system;

one or more pressure transducers that monitor the hydraulic pressure of the parking brake system;

a brake selection device configured to generate a set signal in response to being placed into an engaged state, wherein the brake selection device provides a visual indication to an operator of the parking brake system that the parking brake system is either in an engaged state or a disengaged state, and wherein the brake selection device indicates an actual state of the parking brake system versus a commanded state, and wherein the actual state of the parking brake system is determined based on the fluid pressure of the parking brake system monitored by the one or more pressure transducers;

one or more processors in electronic communication with the brake selection device, the parking brake valve, the plurality of pedals, and the one or more pressure transducers; and a memory coupled to the one or more processors, the memory storing data comprising a database and program code that, when executed by the one or more processors, causes the parking brake system to:

receive the set signal from the brake selection device and the brake signal from the plurality of pedals, wherein the engaged state is the commanded state;

in response to receiving the set signal from the brake selection device and the brake signal from the plurality of pedals, monitor the one or more pressure transducers to determine the hydraulic pressure of the parking brake system;

determine the hydraulic pressure of the parking brake system is less than a threshold pressure; and in response to determining the hydraulic pressure of the parking brake system is less than the threshold pressure, command the brake selection device to indicate the parking brake system is in the disengaged state, wherein the disengaged state is the actual state.

16. The aircraft of claim 15, wherein the one or more processors execute instructions to:

in response to receiving the set signal from the brake selection device and the brake signal from the plurality of pedals, instruct the parking brake valve to move from an opened position into a closed position.

17. The aircraft of claim 16, wherein the one or more processors execute instructions to:

in response to determining the hydraulic pressure of the parking brake system is less than the threshold pressure, instruct the parking brake valve to move back into the opened position.

18. The aircraft of claim 15, wherein the one or more processors execute instructions to:

determine the hydraulic pressure of the parking brake system is equal to or greater than the threshold pressure; and in response to determining the hydraulic pressure of the parking brake system is equal to or greater than the threshold pressure, continue to instruct the brake selection device to indicate the parking brake system is in the engaged state.

19. The aircraft of claim 15, further comprising a force member positioned within a cylinder, wherein the parking brake valve is fluidly connected to the cylinder.

20. The aircraft of claim 19, wherein the threshold pressure indicates the hydraulic pressure at the parking brake valve is sufficient to keep the force member in place within the cylinder for a predetermined amount of time.

21. The parking brake system of claim 1, wherein the brake selection device includes a lever that indicates a state of the parking brake system.

* * * * *